United States Patent Office 2,998,019
Patented Aug. 29, 1961

2,998,019
MEANS FOR CONTROLLING THE CONCENTRATION OF A SUSPENSION
Samuel L. Adelson, Tucson, Ariz., assignor to Infilco Incorporated, Tucson, Ariz., a corporation of Delaware
Filed Dec. 23, 1957, Ser. No. 704,716
8 Claims. (Cl. 137—92)

This invention relates to control means for maintaining th solids concentration of a suspension at a desired value or within a desired range of values. In particular the invention relates to automatic means which regulate the quantity of solids in suspension discharged into or from a treating unit so as to maintain the concentration of a pool of suspension in the treating unit at a predetermined value. The invention may be used with a single unit. It is also well suited to controlling the discharge of solids in suspension to a treating unit from a preceding unit and the discharge from a treating unit to a succeeding unit so as to maintain the concentration of the suspension in a number of succeeding units substantially uniform.

One important application of the invention is in the control of the concentration of a suspension of ion exchange material in an ion exchange plant of the continuous type, wherein ion exchange material in suspension is conveyed sequentially through a series of treating units concurrently or countercurrently to the liquid or slurry to be treated. In such a plant it is essential that the concentration of the suspension in all treating units following the first unit is substantially the same as in the first unit, which is dosed with a predetermined amount of treating material. To obtain this desirable condition, means are provided to cyclically determine the concentration of the pool of suspension of ion exchange material in each of the treating units, to thicken a portion of the suspension in each unit to a higher concentration than that of the pool, and to control the means of each unit for conveying such thickened suspension of ion exchange material to a following unit so that the time they are in operation during a given period is a function of the concentration of the suspension in the pool. If, for example, the ion exchange material is conveyed from unit to unit by air lift, then the time during which air is admitted to the air lift of a unit is regulated in accordance with the concentration of the pool of suspension of ion exchange material in the respective unit or in the next succeeding unit.

It is an object of this invention to provide control means for maintaining the concentration of a suspension substantially constant at a desired value.

Another object of the invention is to provide means for controlling the discharge of treating material from each of a series of sequentially connected treating units to the following unit of the series so as to maintain the concentration of the pool of suspension of treating material in all units substantially uniform.

Another object is to provide automatic means controlling the discharge of thickened treating material from a treating unit over a given period in accordance with the concentration of the pool of suspension of treating material in the unit or in a succeeding unit.

Another object is to provide means for controlling the period of time during which the suspension conveying means of a treating unit are in operation during a control cycle from the concentration of the pool of suspension in the unit or in a succeeding unit.

Another object of the invention is to provide means for controlling in a series of treating units the discharge of thickened ion exchange material in suspension from unit to unit so that the concentration of the pool of suspension of ion exchange material is substantially uniform in all units.

Another object is to provide automatic means for cyclically withdrawing a sample of suspension from a pool of suspension in a treating unit, determining its concentration, and, during each sampling cycle, conveying a suspension having a higher concentration than that of the pool from the unit for a period which is a function of the thus determined concentration of the pool suspension in the treating unit.

Another object is to provide automatic means for cyclically withdrawing a sample of suspension from the pool of suspension in each of a number of sequentially arranged ion exchange units, determining the concentration of the samples, and, during each sampling cycle, admitting air to the air lift discharge means of each ion exchanger unit for a period which is a function of the thus determined concentration of the sample.

Other objects will become apparent from the detailed description of the invention and from the claims.

In carrying out the invention, means are provided for cyclically withdrawing from a treating unit a sample of the suspension whose concentration is to be maintained at a predetermined value into a sampling chamber, wherein it is allowed to settle, for determining the elevation of the surface of the settled sample, for obtaining a signal whose duration is a function of the location of the surface of the settled sample, and for controlling by means of this signal the time during each control cycle during which thickened solids suspension is discharged from the treating unit or introduced into the treating unit. The means for withdrawing thickened suspension are started automatically at the same time during each cycle of the control means, but the length of time they remain in operation depends on the concentration of the suspension in the pool.

Assuming, for example that the incoming suspension has a lower concentration than the pool in a treating unit, then the concentration in the pool will drop. This drop will be counteracted automatically by withdrawing concentrated suspension for a shorter time than when the concentration in the pool remains at the predetermined value. Conversely, if the concentration of the incoming suspension is higher than that of the pool, then the concentration in the pool will rise above the predetermined value. This will be counteracted automatically by withdrawing concentrated suspension for a longer time.

Variations of this type will not only occur where the influent is a suspension, but also where it is a raw water which is treated in the tank by means of chemicals to precipitate solids which are retained in the tank until a predetermined concentration has been established in a slurry pool. Thereafter, concentrated suspension is withdrawn during every cycle of the control means, but the length of withdrawal and therefore the quantity withdrawn, depends on the concentration in the pool. If the raw water is variable and carries more precipitatable solids at one time and less at another, the withdrawal time will vary accordingly, to maintain the desired concentration in the pool.

In a series of tanks the thickened suspension from one tank is discharged into the next following tank. However, the length of discharge during each cycle depends on the conditions in the tank from which the thickened suspension is withdrawn; therefore, the concentration of discharged suspension in and of itself is not indicative of the quantity of solids added to the following tank during each discharge cycle. Any insufficiency or excess of solids over what is needed to maintain the predetermined concentration in the receiving tank is automatically balanced by a shorter or longer discharge from the receiving tank to the next following tank, until all tanks of the series have substantially the same solids concentration in their pools of suspension.

The location of the surface of the settled sample can be ascertained by any suitable means but will be shown herein for purposes of exemplification as determined by means of a float.

The invention will be more readily understood by reference to the drawings which form a part hereof, and wherein like numerals designate similar elements.

FIGURES 2 and 2a show a wiring diagram for the embodiment of FIGURE 1;

FIGURE 3 is a diagrammatic view of the positioning means shown in FIGURE 2a;

Figure 1:
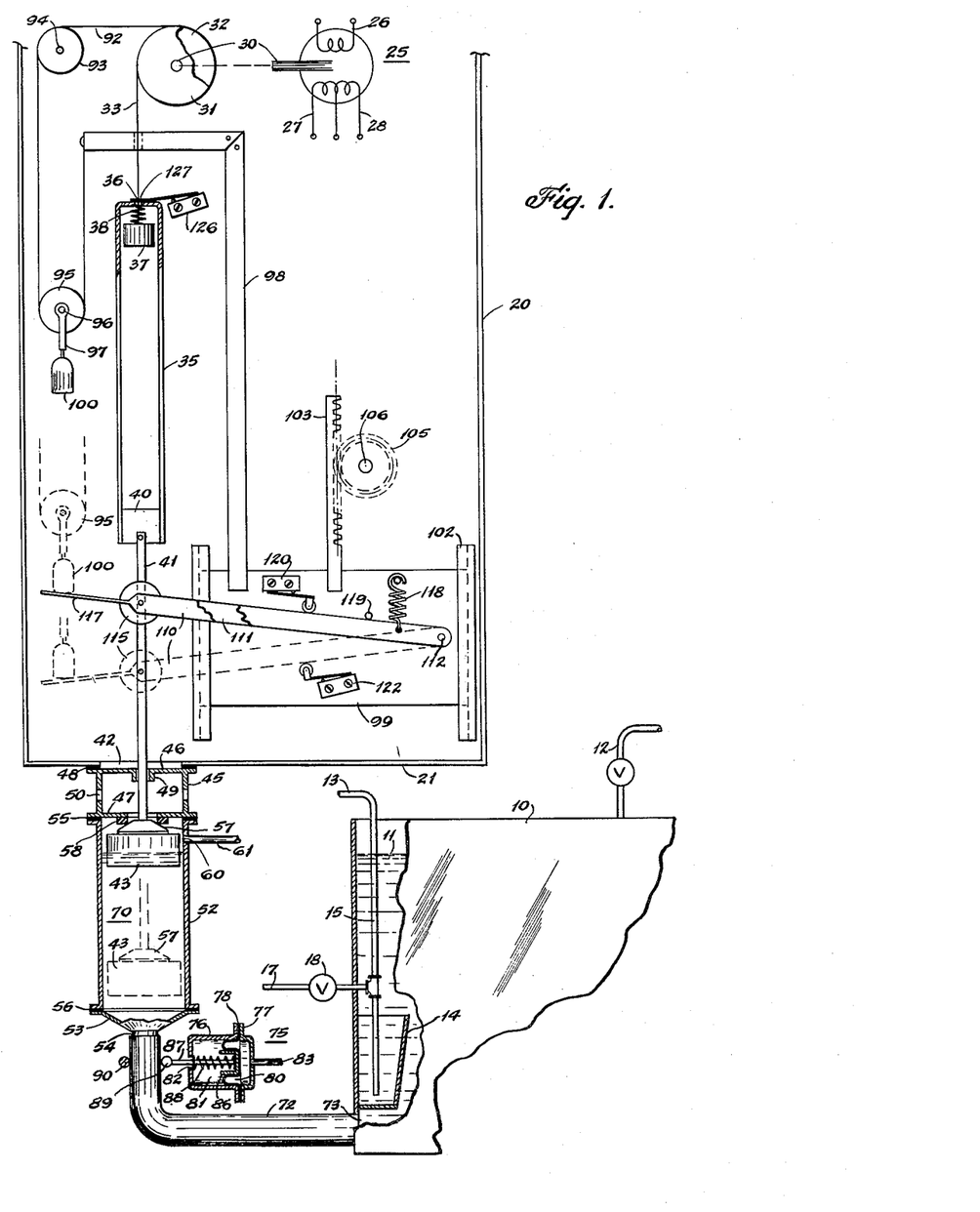
FIGURE 1 is a vertical cross sectional view, partly in elevation, of one embodiment of the invention.
Figure 5:
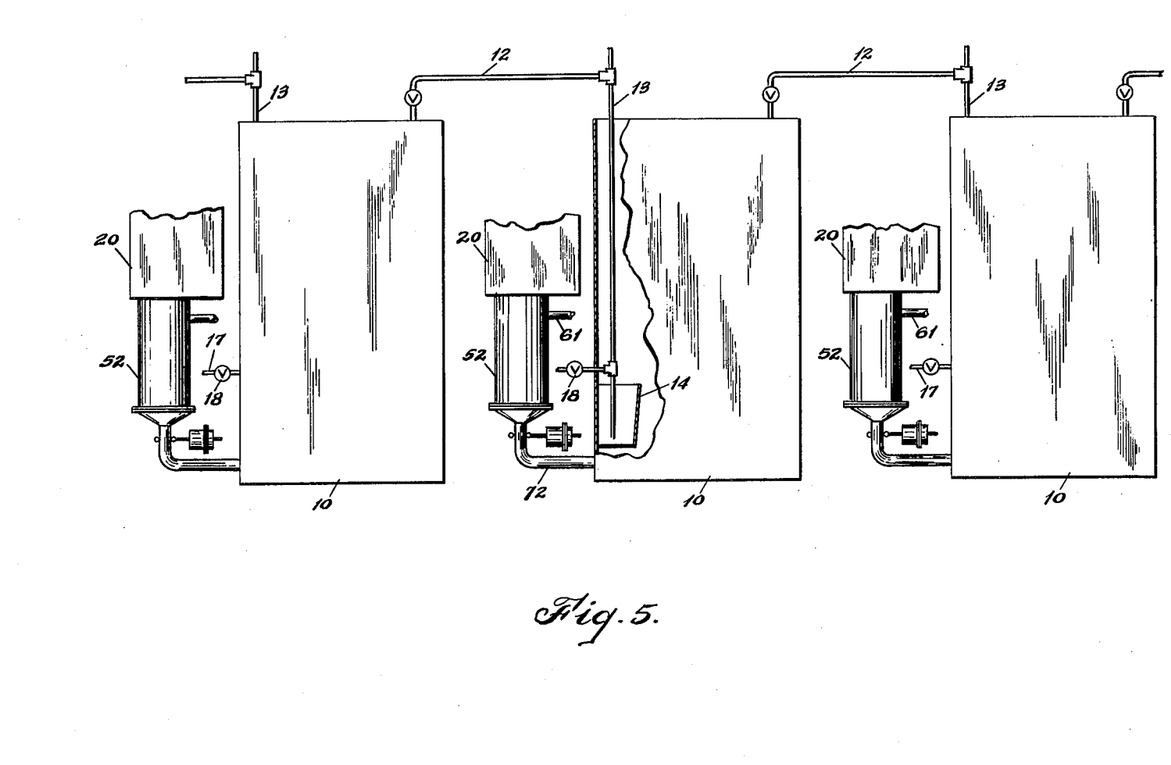
FIGURE 5 is a diagrammatic view of a plurality of sequentially connected treating units, each equipped with control means according to the invention.

The tank 10 contains a pool of suspension 11 which is introduced into the tank 10 by valved inlet means 12. The inlet means 12 may be connected to a source of solids in suspension, such as the solids outlet means of a preceding treating tank. If the solids in suspension in the tank are formed in the course of treatment of liquid with reagents in the tank, the inlet means 12 are used for introducing liquid to be treated, and a reagent inlet, not shown, will be provided. One example of a suspension contemplated herein is the slurry formed in a slurry type liquid treating apparatus. Another example is a suspension of ion exchange material in liquid or slurry to be treated. Suspension is withdrawn from the tank through outlet means 13 after thickening it in a concentrator 14. Due to the thickening in the concentrator, the concentration of the suspension withdrawn from the tank is higher than the concentration of the pool. Depending on the nature of the suspension, the outlet means 13 may lead to a point of further treatment or to waste. There may be a single tank 10 or a series of similar tanks. In the case of a series of tanks 10, as shown in FIGURE 5, the inlet means 12 of each tank following the first of the series are connected to the suspension outlet means 13 of the next preceding tank. Thickened suspension may be withdrawn through outlet means 13 in any suitable manner.

For purposes of illustration and exemplification an air lift 15 is shown in FIGURE 1 and for one tank 10 in FIGURE 5 and will be described herein as the withdrawal means for thickened suspension or for suspension having higher concentration than the suspension in the pool. It will be obvious, however, that the suspension could be discharged by gravity, by means of a pump, or other suitable means.

Air or other gas under suitable pressure for operation of the air lift is introduced from a header, not shown, to each unit through an air line 17 provided with a two way solenoid valve 18 which opens to admit air when it is energized. If the withdrawal is effected by gravity or pumping, the solenoid valve 18 can be used for controlling the outlet means 13, which, in this case, may lead directly from the concentrator 14.

Since the control means for each tank of a series are substantially identical, only one set of each of the embodiments of the control means is shown in detail in the drawings.

A cabinet 20 with a bottom 21 is provided for each tank 10 and houses the means for controlling the concentration of the suspension in the pool of the respective tank 10.

A reversible motor 25 of the shaded pole type is fixed to the cabinet 20 and has a field 26 and shading coils 27 and 28. Fixed to the shaft 30 of motor 25 are two equal grooved pulleys 31 and 32. A flexible cable 33 is fixed at one end to the pulley 31 and extends into a bail 35 through an opening 36 in the upper end of the bail. A weight 37 is fixed to the free end of the cable 33 and is freely slidable in bail 35. A spring 38 is affixed to the upper end of the bail 35 and encircles the cable 33, as shown in FIGURE 1.

To the lower end of the bail 35 is secured a plate 40 of copper or other good conductor of electricity. A rod 41 is fixed with its upper end to the plate 40. The cabinet 20 has an opening 42 in its bottom 21 through which the rod 41 extends to outside the cabinet in all positions of the plate 40. Affixed to the lower end of the rod is a float 43.

A cylinder 45 is mounted below the opening 42 and has a closed top 46 and bottom 47. A gasket 48 is provided between the top 46 of the cylinder 45 and the bottom 21 of the cabinet 20, as shown. A guide 49 is provided in the top 46 in which the rod 41 slides with very small but free clearance. A port 50 in the side wall of the cylinder 45 connects the interior of the cylinder to atmosphere. Flanged to the cylinder 45 is an open top and open bottom tubular member 52 of sufficient width that the float 43 can freely move in it between upper and lower positions. Flanged to the lower end of the tubular member 52 is an inverted frustoconical bottom element 53 from whose apex a relatively narrow tube 54 extends. A gasket 55 is inserted between the lower end of the cylinder 45 and the tubular member 52, and a gasket 56 is inserted between the lower end of tubular member 52 and the upper edge of the bottom element 53.

The top of the float 43 is shaped to form a valve member 57 and the bottom of cylinder 45 has a port shaped to form a resilient valve seat 58. When the float 43 is in its uppermost position, shown in full lines in FIGURE 1, its valve portion 57 is seated on the seat 58 and seals the cylinder 45 from the space within the tubular member 52. A port 60 in the upper portion of the tubular member 52, above the water line therein, is connected to a line 61 which in turn is connected to a source of air or other gas under pressure by a header 62, provided with a two way solenoid valve 64 (see FIGURE 2a). When the valve 64 is energized it admits air or other gas under pressure to the header 62, line 61 and tubular member 52. The tubular member 52 and bottom member 53 form a sampling chamber 70 which is closed to atmosphere when the float 43 is seated on the seat 58.

A flexible hose 72, attached to the tube 54 with one end, connects the sampling chamber 70 with the tank 10 through a port 73 in the wall of the tank 10, as shown.

A check valve 75 comprises a casing 76 and a cover 77. A rolling type diaphragm 78 is clamped with its outer edge between the casing 76 and cover 77 and separates the space therein into a gas-tight chamber 80 and a chamber 81 open to atmospheric pressure through an opening 82 in its bottom. The chamber 80 is connected to a source of air or other gas under pressure and to atmosphere through a pipe 83 which is connected to a gas header 84 provided with a three way solenoid valve 85. (See FIGURE 2a.) Any number of solenoid valves 85 can be connected to header 84 to operate a series of control units in parallel. A piston 86 is affixed to the center portion of the diaphragm 78 and has a piston rod 87 extending therefrom through the opening 82. A spring 88 encircles the rod 87 and bears with one end against the piston 86 and with the other end against the bottom of the casing 76. At its free end the piston rod 87 carries a bar 89 which is forced against a stationary bar 90 when gas pressure is applied in chamber 80, whereby the hose 72 is pinched and the passage therethrough between the tank 10 and the sampling chamber 70 is closed. Upon release of the gas pressure in chamber 80, the spring 88 retracts the piston rod 87 and bar 89 and the passage through the hose 72 is again open for communication between tank 10 and sampling chamber 70.

A cable 92 is fixed at one end to the pulley 32 and passes over an idler pulley 93 which is free to rotate about a shaft 94. The cable 92 then passes over a pulley 95 which is free to rotate about a shaft 96 which is set in a clevis 97. The free end of the cable 92 is fixed to a bracket 98 which is supported by a plate 99. To the clevis 97 is fixed a weight 100 which rises and falls with the bail 35, but the pulley arrangement is so that the weight 100 travels at one-half the rate of travel of the bail.

The plate 99 is slidable in guides 102 and is adjustable vertically, for a purpose to be explained later, by means of a rack 103, fixed at one end to the plate 99, and a pinion 105, secured to a shaft 106 and meshing with the teeth of the rack 103. Rotation of the shaft 106, as by means of a knob, not shown, will raise or lower the plate 99 to a desired position, in which it can be held by any suitable means, such as a clamp, set screw or the like, not shown.

Two arms 110 and 111, held in spaced relationship by suitable spacers, not shown, are pivoted at one end about a shaft 112 which is fixed to the plate 99. At the other ends of the arms 110 and 111 are fixed coils 115 and 116, respectively. (See FIGURE 2.) Coil 115 is in the grid circuit and coil 116 is in the plate circuit of an electronic oscillator circuit. The coil end of arm 110 has a platform-like extension 117 which lies within the path of travel of the weight 100, such that when the weight 100 reaches the platform 117, it will move the latter with it along its further downward path to the position shown in dotted lines in FIGURE 1. A spring 118 whose pin is mounted on the plate 99, urges the arms 110 and 111 upwardly against a stop 119, also mounted on plate 99.

A single-throw snap action switch 120 is mounted so that the arm 110, in its uppermost position, shown in full lines in FIGURE 1, bears against its actuating lever thereby holding the switch, and the circuit through the switch, open. A double-throw snap action switch 122, having an actuating lever 123 and contacts 124 and 125 (see FIGURE 2), is mounted so that arm 110, when it reaches its lowermost position, shown in dotted lines in FIGURE 1, opens contact 124 and closes contact 125.

A normally closed single-throw snap action switch 126 is provided with an eye 127 at its actuating lever through which passes the cable 33. The switch 126 is located so that the bail 35 in its uppermost position contacts the eye 127 and opens the switch 126. Switches 120, 122 and 126 may be of the type manufactured and sold by a division of First Industrial Corporation of Freeport, Illinois, under the name "Micro Switch." For convenience sake switches of this general type will be referred to herein as micro switches, but it will be understood that other snap action switches can be used instead.

Figure 2:
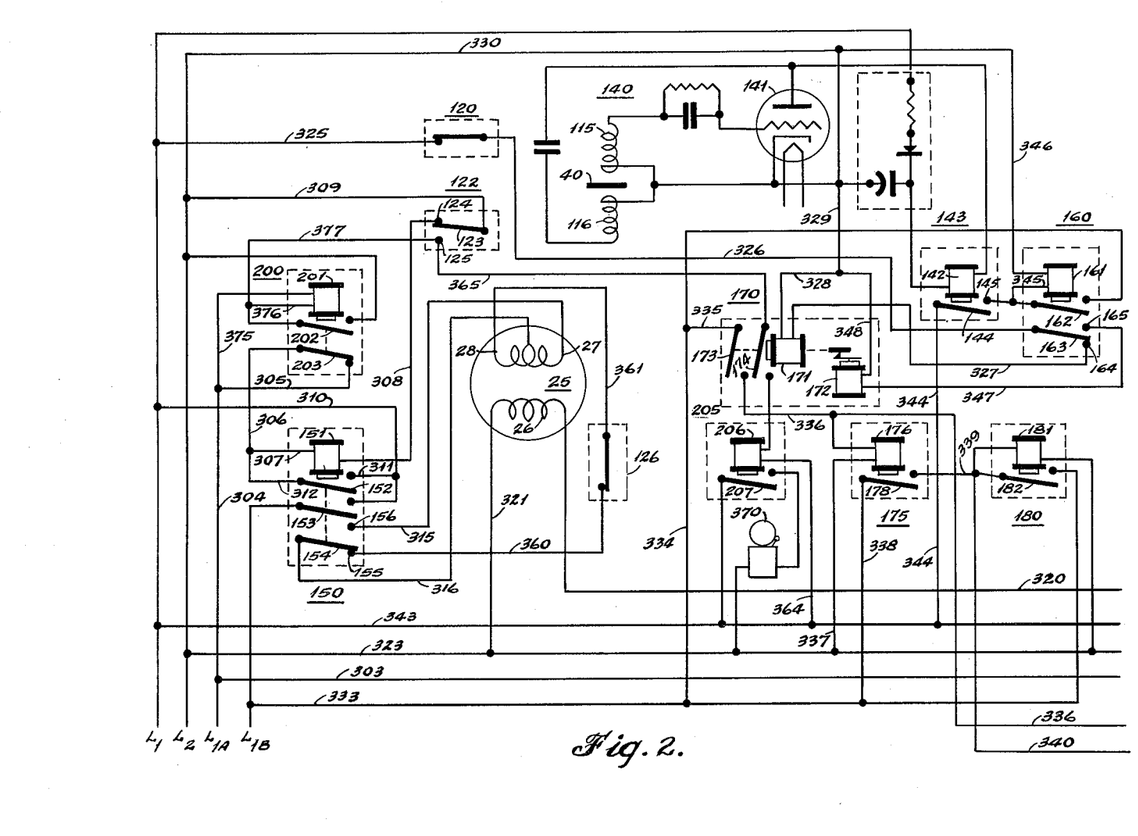
Figures 2A, 3:
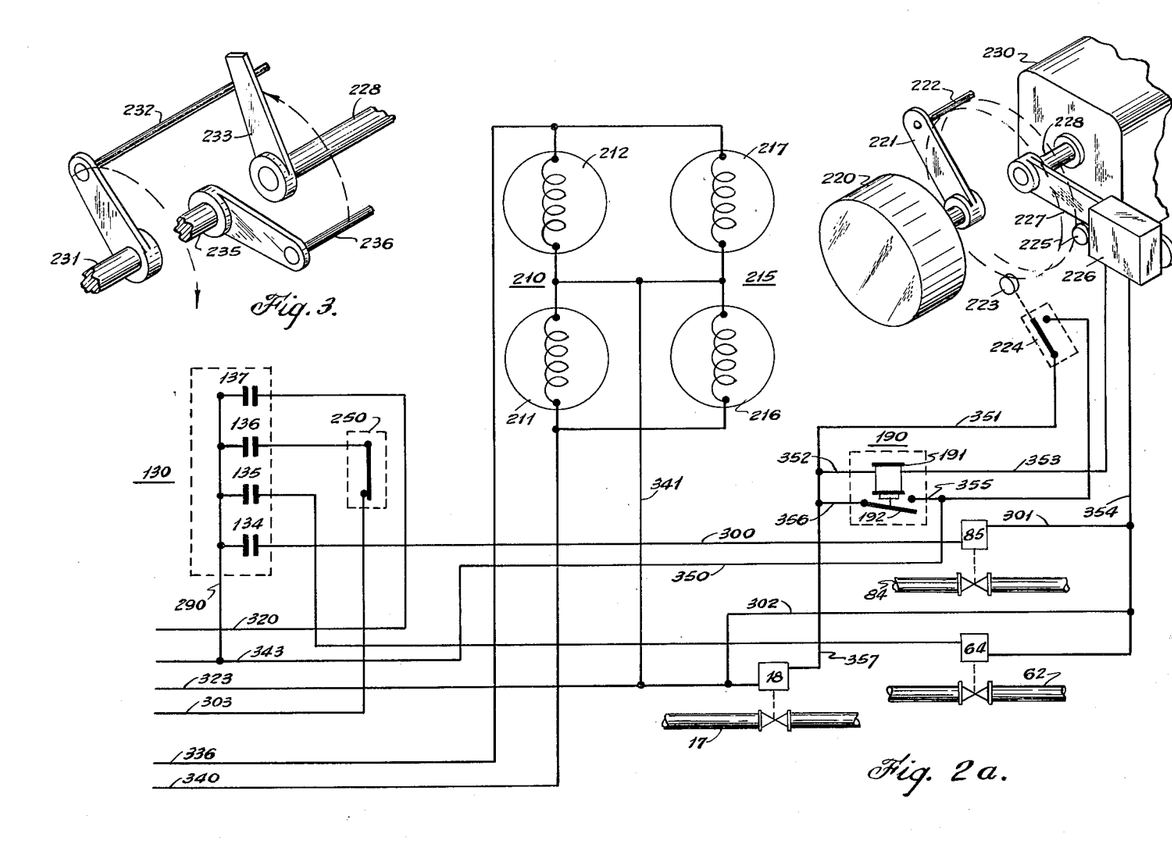

A program timer is shown diagrammatically in FIGURE 2a, at 130, and has contacts 134, 135, 136 and 137. These contacts are opened and closed in predetermined sequences for predetermined durations of time in a given continuing time cycle.

An electronic oscillator circuit is shown generally at 140 in FIGURE 2. When the tube 141 is in a state of oscillation, its plate resistance is sufficiently high to prevent energizing the coil 142 of plate relay 143 to the extent required to pull in the pole 144. The tube 141 is in a state of oscillation if coil 116 in its plate circuit is in condition to transfer energy to coil 115 in its grid circuit. However, if a metallic substance, such as plate 40, is interposed between the coils 115 and 116, the transfer of energy from the plate to the grid circuit ceases and the current in the plate circuit will increase sufficiently to energize the coil 142 of relay 143 to pull the pole 144 into engagement with contact 145.

A three pole relay shown generally at 150 has a coil 151, two normally open poles 152 and 153, and a double throw pole 154 normally bridging a contact 155 and, when the coil 151 is energized, bridging a contact 156.

A two pole relay 160 has a coil 161, one single throw pole 162 and a double throw pole 163 normally engaging a contact 164 and engaging a contact 165 when the coil 161 is energized.

A relay 170 of the latch-in type has a pull-in-coil 171, a release coil 172 and two normally open poles 173 and 174.

175 is a single pole normally open relay which has a coil 176 and a pole 178.

A single pole normally open relay 180 has a coil 181 and a pole 182.

Another single pole normally open relay 190, shown in FIGURE 2a, has a coil 191 and a pole 192.

A two pole relay 200 (see FIGURE 2) has a coil 201, a normally open pole 202 and a normally closed pole 203.

A single pole relay 205 has a coil 206 and a normally open pole 207.

At 210 in FIGURE 2a is shown a motor and magnetic clutch of the type including a motor 211 and a magnet 212 operating a clutch mechanism, not shown, so that when it is energized the slow speed output shaft of the motor 211 rotates. When the magnet 212 is de-energized the motor armature rotates but the output shaft does not rotate.

At 215 is shown a motor and magnetic clutch similar to the motor and magnetic clutch 210, including a motor 216 and a magnet 217. However, with this motor and magnetic clutch, when the magnet 217 is energized the output shaft does not rotate though the motor armature rotates, and when the magnet 217 is de-energized then the output shaft does rotate. Motors of this type are available on the open market since several years. The assemblies 210 and 215 form part of a positioning device, as will be explained below.

A synchronous motor 220 rotates continuously and makes one revolution in the same time as the duration of one cycle of the timer 130. Mounted on the shaft of motor 220 is an arm 221, at the end of which is located a projecting pin 222. In the path of rotation of the pin 222 is the roller 223 of an adjustably mounted fixed micro switch 224; also in the path of rotation of the pin 222 is the roller 225 of a micro switch 226 which is fixed to an arm 227 on the shaft 228 of a positioning device 230.

As pointed out above, the positioning device 230 includes the two motor and magnetic clutch combinations 210 and 215, which are shown in FIGURE 2a separately from the device 230 for clarity's sake. Motors 211 and 216 rotate in opposite directions, such as motor 211 clockwise, and motor 216 counterclockwise, as seen in FIGURE 2a. As shown in FIGURE 3, the output shaft 231 of motor 211 carries a pin 232 which is adapted to contact an arm 233 fixed to the shaft 228 which carries also arm 227 with micro switch 226 and move it in one direction while the magnets 212 and 217 are energized; the output shaft 235 of motor 216 carries a pin 236 which is adapted to contact the arm 233 and move it in the opposite direction when the magnets 212 and 217 are de-energized. The shaft 228 is held by brake means, not shown, in any position to which it has been moved. The pins 232 and 236 are spring biased to their zero positions and flip back thereto as soon as the magnets are energized or de-energized, respectively. Thus, when circuits have been established through magnets 212 and 217 and through motors 211 and 216, the pin 232 on the output shaft 231 of motor 211 starts rotating clockwise and continues to rotate until the circuit through the magnets is broken, when it flips back to its zero position. When the circuit is broken and the magnets are de-energized, the pin 236 on the output shaft 235 of motor 216 starts rotating counterclockwise and rotates until the magnets are again energized in the following cycle of operation, at which time the pin 236 flips back to its zero position. If the "time on," i.e., the period during which the magnets are energized in any one cycle is the same as in the previous cycle, the pin 232 will just reach the arm 233 on shaft 228 without moving the arm. If the "time on" is increased, the pin 232 will move the arm 233 in accordance with the difference in "time on" and then flip back to its zero position. Under both circumstances, i.e., if "time on" remains the same or increases, the pin 236 on the output shaft of motor 216, which rotates for the balance between the "time on" and a complete time cycle, will just reach the arm 233 during its period of rotation, but will flip back to its zero position without moving the arm. If, however, a decrease in "time on" occurs, then the pin 232 of motor 211 will not reach the arm 233 during its shortened time of rotation, but pin 236 of motor 216, whose time of rotation is now correspondingly lengthened, will push the arm 233 and shaft 228 in the opposite direction to a position corresponding to the shortened "time on." Thus, the position of arm 233, shaft 228, arm 227 and micro switch 226 will always be proportional to "time on" of the magnets.

A normally closed disconnect switch 250 (FIGURE 2a) is provided to permit taking the unit out of operation.

In the following description of the operation it is assumed that the program timer 130 is set for a five minute cycle and the beginning of a cycle is referred to as zero time. At zero time the sample in chamber 70 has reached its maximum level. Contact 134 of timer 130 has just closed to energize the coil of solenoid valve 85 to open it and admit gas under pressure to header 84, pipe 83 and chamber 80 of check valve 75. To energize solenoid valve 85 the circuit will be from a source of power $L_1$ through header 343, conductor 290, contact 134 of timer 130, conductor 300, coil of solenoid valve 85, conductors 301 and 302 and header 323 to $L_2$. Gas admitted to the chamber 80 of check valve 75 forces the bar 89 against the stationary bar 90 to pinch the hose 72 and close the passageway between tank 10 and sampling chamber 70, thus preventing any portion of the sample from leaving the chamber 70 while it is settling therein.

Also at zero time contact 136 of timer 130 closes and energizes coil 151 of relay 150 through a circuit leading from $L_1$, through contact 136, closed switch 250, header 303, conductors 304 and 305, pole 203 of relay 200, conductors 306 and 307, coil 151, conductor 308, contact 124 and pole 123 of micro switch 122 and conductor 309 to $L_2$. When coil 151 is energized, normally open poles 152 and 153 close and double-throw pole 154 leaves contact 155 and bridges contact 156. A holding circuit is now established for coil 151 from $L_1$, through conductors 310 and 311, pole 152, conductors 312 and 307, coil 151, conductor 308, contact 124 of micro switch 122 and conductor 309 to $L_2$. Shading coil 27 of motor 25 is now in a closed circuit through conductor 315, contact 156 and pole 154 of relay 150, and through conductor 316 back to the common connection of shading coils 27 and 28.

About 2½ minutes after zero time contact 137 of timer 130 closes and energizes the field coil 26 of motor 25 by way of $L_1$, contact 137, conductor 320 and coil 26 of motor 25, conductor 321 and header 323 to $L_2$. Since the field of motor 25 is now energized and shading coil 27 is in a closed circuit, the motor shaft 30 will rotate so as to cause a lowering of weight 100. At the same time the weight 37, the bail 35, plate 40 and float 43 will also be lowered, but, due to the pulley arrangement, at twice the rate of travel of the weight 100.

When the float 43 reaches and partially enters the settled material in the sampling chamber 70, the weight 37 within the bail 35 will continue to move downward, but the plate 40 moving with the float, will have stopped at a certain distance below the uppermost position of the coils 115 and 116, depending on the height and density of the material in the sampling chamber 70.

When the float will have stopped moving downwardly, the weight 100 will have about reached the extension 117. The weight 100 will continue to move downwardly and will force the extension 117, arms 110 and 111 and coils 115 and 116 to move downwardly with it.

As soon as the arms 110 and 111 start their downward travel the normally closed micro switch 120, which previously has been held open by arm 110, will close. This establishes a circuit from $L_1$ through conductor 325, micro switch 120, conductor 326, pole 163 of relay 160, conductor 327, coil 171 of latch-in relay 170 and conductors 328, 329 and 330 to $L_2$. This energizes coil 171 of relay 170, which thereupon closes its poles 173 and 174. A circuit is now established to energize magnets 212 and 217 of motor and magnetic clutch assemblies 210 and 215, respectively as follows: From $L_{1B}$ through header 333, conductors 334 and 335, pole 173 of relay 170, conductor 336, magnets 212 and 217, and through conductor 341 and header 323 to $L_2$.

At the same time a circuit will be established from $L_{1B}$, through header 333, conductors 334 and 335, pole 173, conductor 336, coil 176 of relay 175, conductor 337 and header 323 to $L_2$. Since coil 176 is now energized and closes pole 178, a circuit will now be established through motors 211 and 216 by way of $L_{1B}$, header 333, conductor 338, pole 178, conductors 339 and 340, motors 211 and 216, conductor 341 and header 323 to $L_2$. With this circuit established, the output shaft of motor 211 rotates, while the rotation of the output shaft of motor 216 stops.

When the coils 115 and 116 in their downward movement reach a position such that a certain portion of the plate 40 lies between the coils, the coil 142 of plate relay 143 of the electronic circuit 140 will be energized and pull pole 144 into engagement with contact 145. Closing of pole 144 establishes a circuit from $L_1$, through header 343, conductor 344, pole 144 of relay 143, conductor 345, coil 161 of relay 160, conductors 346 and 330 to $L_2$. This energizes coil 161 which closes its normally open pole 162 and pulls pole 163 into engagement with contact 165. A holding circuit is now established as follows: From $L_{1B}$ through header 333, conductor 334, pole 162, conductor 345, coil 161 and conductors 346 and 330 to $L_2$.

Power is now applied to the release coil 172 of latch-in relay 170. The circuit is as follows: From $L_1$ through conductor 325, micro switch 120, conductor 326, pole 163 and contact 165 of relay 160, conductor 347, coil 172 of latch-in relay 170, and conductors 348, 329 and 330 to $L_2$. This will break the circuit through the magnets 212 and 217 at pole 173 of relay 170.

As pointed out above, the position of shaft 228 of positioning device 230, and of its arm 227 and the micro switch 226 carried by the arm, depends upon and is proportional to the time between energizing and deenergizing magnets 212 and 217. Since the magnets are energized when the arms 110 and 111 leave their uppermost, or zero, position, and are deenergized when the arms 110 and 111 reach a position where a certain portion of plate 40 lies between them, and since the position of plate 40 is dependent on the height of the sediment in the sampling chamber 70, the position of micro switch 226 also is dependent on the height of the sediment.

When pin 222 on arm 221 contacts roller 223 of micro switch 224, it closes the switch momentarily, and a complete circuit is established from $L_1$ through header 343, conductor 350, now closed micro switch 224, conductors 351 and 352, coil 191 of relay 190, conductor 353, normally closed micro switch 226, conductors 354 and 302 and header 323 to $L_2$. This energizes coil 191 to close contact 192 and establishes a holding circuit for coil 191 as follows: From $L_1$ through header 343, conductors 350 and 355, pole 192, conductors 356 and 352, coil 191, conductor 353, switch 226, conductors 354 and 302, and header 323 to $L_2$. At the same time current is supplied to the coil of solenoid valve 18 to admit air through air line 17 to the air lift 15 (FIGURE 1). The circuit is as follows: From $L_1$ through header 343, conductors 350 and 355, pole 192 of relay 190, conductors 356 and 357, coil of solenoid valve 18, and header 323 to $L_2$. Because of the holding circuit for coil 191, the solenoid valve 18 will remain open after pin 222 has passed over and left the roller 223 and micro switch 224 opens.

When pin 222 contacts roller 225 of normally closed micro switch 226, the switch opens momentarily and the holding circuit through coil 191 of relay 190 is broken to de-energize the coil of solenoid valve 18 and shut off the air supply to the air lift 15. The time during which material is withdrawn from tank 10 is thus dependent on the position of micro switch 226. Since air for the air lift is supplied in each cycle for the period of time during which pin 222, rotating at a constant rate, travels from fixed micro switch 224 to micro switch 226, whose position is proportional to the height of the sediment in sampling chamber 70, the time during which suspension is withdrawn from tank 10 is also proportional to the height of the sediment and is therefore a function of the concentration of the suspension in tank 10.

About 3.50 minutes after zero time the arms 110 and 111 reach their lowermost position and open contact 124 and close contact 125 of micro switch 122. This serves a triple purpose. Firstly, it initiates raising of the float by breaking the circuit through coil 151 of relay 150 at pole 152 to de-energize relay 150. When relay 150 is de-energized, pole 154 will engage contact 155. This will connect the common terminal of the shading coils 27 and 28 of motor 25 to coil 28 by way of conductor 316, pole 154 and contact 155 of relay 150, conductor 360, normally closed micro switch 126 and conductor 361 to reverse the motor 25 and raise the float 43, and bail 35 as well as the weight 37. When the bail 35 reaches its uppermost position in which it contacts the eye 127 of the normally closed micro switch 126, the switch opens and motor 25 stops, since switch 126 is in the circuit of shading coil 28.

Secondly, closing of contact 125 of switch 122 permits a malfunction indication in case the latch-in relay 170 has not been released by the time contact 125 closes. In such case a circuit will be established from $L_1$ through header 343, conductor 364, coil 206 of relay 205, pole 174 of latch-in relay 170, conductor 365, contact 125 of switch 122, and conductor 309 to $L_2$. This will close pole 207 of relay 205 and bring power supply from $L_1$ to any momentary contact device 370 to give a visual or audible alarm or both.

The third purpose is applicable to a series of treating units. In such a series it is not expected that the arms 110 and 111 of all units will reach their lowermost position simultaneously. So long as arms 110 and 111 in any of the units are still moving downwardly after the arms of the other units have reached their lowermost position and activated their micro switches 122 to reverse their motors 25, the $L_{1A}$ header will still have the potential $L_1$ through pole 152 of its relay 150 and its conductor 304. The arms 110 and 111 of the other units will have started their upward movement, but potential $L_1$ in the $L_{1A}$ header will again energize the coils 151 of the other units to lower their arms. This raising and lowering will continue until the arms 110 and 111 of the slowest unit have reached their lowermost position.

To eliminate this undesirable condition, relay 200 is used. When contact 125 of micro switch 122 of any one unit is made, coil 201 of the respective relay 200 is energized as follows: $L_1$, through conductors 310 and 311, now closed pole 152 of relay 150, conductors 312 and 306, pole 203 of relay 200, conductors 305 and 375, coil 201, conductors 376 and 377, contact 125 and conductor 309 to $L_2$. This will open the contact at pole 203 of relay 200 and remove $L_1$ potential which may exist in the $L_{1A}$ header from coil 151 of the respective relay 150. The holding circuit through pole 202 of relay 200 from $L_{1A}$ to $L_2$ will keep the coil 151 deenergized. When the arms 110 and 111 of the slowest unit have finally activated their switch 122, the $L_{1A}$ potential will be removed from the $L_1$ header and the coil 201 will be de-energized.

About 4.50 minutes after zero time the arms 110 and 111 have reached their uppermost position and open the micro switch 120, whereby the potential $L_1$ will be removed from the coils of latch-in relay 170. Also the float 43 will have been raised in the sampling chamber 70. In its uppermost position the float 43 seals the top of the sampling chamber 70 and prevents passage of gas from the sampling chamber to atmosphere.

About 4.55 minutes after zero time contact 135 of timer 130 closes to energize the coil of solenoid valve 64 to open the valve and admit gas pressure to header 62 and through line 61 to sampling chamber 70. At the same time gas is released from chamber 80 of check valve 75 through opening of contact 134 of timer 130 which de-energizes the three way solenoid valve 85 and allows the gas to exhaust through header 84 to atmosphere. This reopens the passage through hose 72 so that the gas entering the upper portion of the sampling chamber 70 through line 61 can blow back the sample into the tank 10.

About 4.65 minutes after zero time contact 135 of timer 130 opens, whereby the coil of solenoid valve 64 is de-energized and the valve closes, shutting off the purge air. Immediately thereafter a new sample enters the sampling chamber 70 from tank 10.

About 4.66 minutes after zero time contact 136 of timer 130 closes for a few seconds to lower the float 43 to relieve air trapped in the sampling chamber 70 to atmosphere.

About 4.75 minutes after zero time contact 137 of timer 130 opens to remove $L_1$ from the field coil 26 of motor 25.

5 minutes after the start of the cycle, i.e., at zero time, contact 134 closes again to close all check valves and the cycle is repeated.

If it is desired to increase or decrease the concentration of the pool of suspension in tank 10 from a previously set value, the plate 99 is lowered or raised by turning of shaft 106 in the proper direction. When the plate is raised a certain distance, the weight 100 is raised at the same time but through half the distance, as is necessary, since the weight 100 must travel at half the rate as the bail 35 and the parts attached thereto.

When the bail is lowered after the plate 99 has been raised, the float 43 will reach the same level as before, but the micro switch 120 will close sooner, because the arms 110 and 111 are now higher than before plate 99 was raised, and extension 117 therefore is reached sooner by the weight 100. Therefore the time between energizing and de-energizing of magnets 212 and 217 and motors 211 and 216 will be longer, the micro switch 226 will be positioned a greater distance from its zero position, and, consequently, the duration of the air supply to the air lift 15 is increased. In this manner the level of concentration in the pool is decreased, as more suspension of higher concentration than that of the pool is removed. Obviously, to increase the concentration of the pool, the plate is lowered, whereby the micro switch 120 closes later and the duration of the air lift becomes shorter.

It will be obvious that with a series of treating units the same cycle is automatically controlled by timer 130 for all units.

Figure 4:
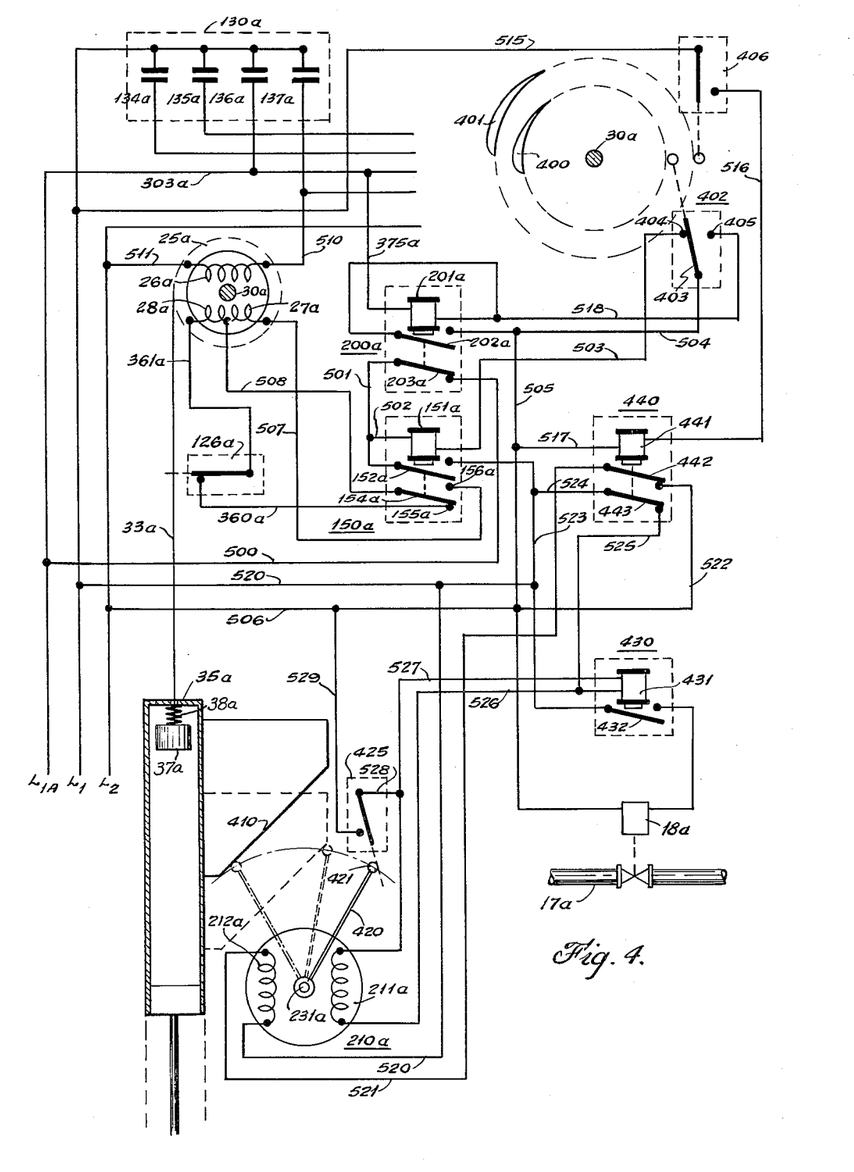
FIGURE 4 is a partial vertical cross sectional view of a modified embodiment of the invention and a wiring diagram therefor.

The embodiment of FIGURE 4 also provides control means for maintaining the concentration of a suspension substantially constant. As in the embodiment of FIGURES 1 and 2 means are provided for withdrawing a sample of suspension from a pool of suspension in a treating unit and allowing it to settle in a sampling chamber, for determining the surface elevation of the sediment and for controlling withdrawal of thickened suspension from the treating unit in proportion to the concentration of the pool of suspension thus determined.

The tank 10 with its solenoid valve controlled air lift 15, the sampling chamber 70 with its solenoid valve controlled inlet 60, hose connection 72, solenoid valve controlled check valve 75 and float 43 may be the same as in FIGURE 1 and are not shown in FIGURE 4.

The motor 25a, cable 33a, weight 37a, spring 38a, bail 35a, micro switch 126a and relay 200a are the same as in FIGURE 1 and function in the same manner.

The timer 130a with its contacts 134a, 135a, 136a and 137a controls the cycle of operations in the same manner as the timer 130 controls the cycle of operations of the embodiment of FIGURES 1 to 3.

A relay 150a has a coil 151a, and one normally open pole 152a and one double throw pole 154a adapted to bridge a contact 155a when coil 151a is de-energized, and a contact 156a when the coil is energized.

Affixed to the shaft 30a of motor 25a in this embodiment, in addition to the pulley 31, which is not visible in FIGURE 4, are also cams 400 and 401. (For clarity these cams are shown separately from the motor.) Cam 400 is adapted to engage a double throw micro switch 402, having a pole 403 normally bridging a contact 404 and adapted to bridge a contact 405; cam 401 is adapted to engage the single pole normally open micro switch 406.

Affixed to the bail 35a is a cam 410 as shown.

The motor-magnetic clutch assembly 210a is of the same type as described in connection with the assembly 210 of FIGURE 2a, i.e., the output shaft 231a of motor 211a rotates only when the clutch magnet 212a is energized, even though the rotor of the motor is rotating. Rotation of motor 211a is assumed herein to be clockwise as seen in FIGURE 4. Affixed to the output shaft 231a of the motor is an arm 420 carrying a pin 421. When the clutch magnet 212a is de-energized the output shaft 231a is rotated by an internal spring, not shown, counterclockwise toward a zero position, until the pin 421 on arm 420 engages the outer edge of cam 410, which acts as a stop.

A normally closed micro switch 425 is adapted to open its contact when the arm 420 engages it.

At 430 is shown a single pole normally open relay, whose coil 431 is in parallel with the motor 211a of assembly 210a. Coil 431, therefore, is energized when motor 211a is energized. Pole 432 of relay 430 is in a circuit through the coil of solenoid valve 18a which, when energized, holds the valve open to admit air from air line 17a to the air lift in tank 10. When coil 431 is energized and closes its pole 432, this circuit is established and solenoid valve 18a opens to admit air to the air lift.

A relay 440 has a coil 441 and two normally closed poles 442 and 443.

The operation is as follows:

Assuming contacts 134a of timer 130a has closed at zero time to admit air to check valve 75 and retain the sample in chamber 70, as described in connection with FIGURE 1 and that contact 136a has closed and energized coil 151a of relay 150a by way of $L_{1A}$, conductor 500, pole 203a of relay 200a conductors 501 and 502, coil 151a, conductor 503, contact 404 and pole 403 of micro switch 402, and conductors 504, 505 and 506 to $L_2$. This energizes coil 151a which closes pole 152a and pulls pole 154a into engagement with contact 156a. This puts shading coil 27a in a closed circuit through conductor 507, contact 156a and pole 154a of relay 150a, and through conductor 508 to the common connection of shading coils 27a and 28a. When now contact 137a of timer 130a closes, a circuit is established from $L_1$, through contact 137a conductor 510, field coil 26a of motor 25a, and conductor 511 to $L_2$. The motor 25a will now rotate to lower the weight 37a, bail 35a and the float, not shown, in the same manner as described in connection with FIGURE 1.

The cams 400 and 401 are so positioned, that when weight 37a is about one half inch below the top of the bail 35a after the float comes to rest at its lowermost position, i.e., when the concentration of the suspension is at minimum, the cam 401 will engage normally open micro-switch 406 to close it. This will establish a circuit through coil 441 of relay 440 by way of $L_1$, conductor 515, micro switch 406, conductor 516, coil 441, and conductors 517, 505 and 506 to $L_2$. When coil 441 is energized, normally closed poles 442 and 443 open. This will break the circuit through the motor 211a and magnet 212a of the motor-magnetic clutch assembly 210a and the motor will stop. Because of the internal spring the arm 420 will move quickly toward the cam 410 until it is stopped when the pin 421 engages the edge of the cam 410, as shown in dot and dash lines in FIGURE 4.

As soon as the arm 420 leaves the micro switch 425, the switch closes.

When the cam 400 reaches the micro switch 402, the pole 403 will be moved to engage contact 405. This closes a circuit from $L_{1A}$ through conductors 303a and 375a, coil 201a of relay 200a, conductor 518, contact 405 and pole 403 of switch 402, and conductors 504, 505 and 506 to $L_2$. This energizes coil 201a which closes its pole 202a and opens its pole 203a. Opening of pole 203a de-energizes coil 151a of relay 150a, whereupon pole 154a again bridges contact 155a. The shading coil 28a of motor 25a is now in a closed circuit from the common connection through conductor 508, pole 154a and contact 155a of relay 150a conductor 360a, normally closed micro switch 126a and conductor 361a to coil 28a. Motor 25a will now rotate in the reverse direction to lift the float, bail 35a and weight 37a. As described in connection with FIGURE 1, when the bail 35a reaches its uppermost position it contacts the eye of the micro switch 126a and opens the switch, whereupon the motor 25a stops.

Reversal of motor 25a also reverses the cams 400 and 401. When cam 401 leaves micro switch 406, the switch opens. This de-energizes the coil 441 of relay 440, whereupon poles 442 and 443 close.

Power will now be applied to the magnet 212a as follows: From $L_1$ through conductor 520, magnet 212a, conductor 521, pole 442 and conductors 522 and 506 to $L_2$.

Power will also be applied to motor 211a as follows: From $L_1$ through conductors 520, 523 and 524, pole 443, conductors 525 and 526, motor 211a, conductors 527 and 528, closed micro switch 425 and conductors 529 and 506 to $L_2$. The motor 211a and magnet 212a being now energized, arm 420 will leave the cam 410 and be turned clockwise toward the micro switch 425. When the pin 421 reaches the switch 425, it opens the switch and breaks the circuit of the motor 211a, so that the motor stops.

The coil 431 of normally open relay 430, which is in parallel with motor 211a, will remain energized and hold pole 432 closed as long as the motor 211a is energized. Solenoid valve 18a will be held open and air be admitted to the air lift, as long as pole 432 is closed. The time motor 211a, which is of the synchronous type, is energized is the time it takes the arm 420 to travel from the edge of the cam 410 to the position where its pin 421 opens the micro switch 425. This time varies with the position of the cam 410, which in turn depends on the height of the sediment on which the float comes to rest in its downward movement.

As shown in full lines in FIGURE 4, the cam 410 is in a position corresponding to the maximum height of the settled material and it will take pin 421 a maximum time to reach the micro switch 425; hence the motor 211a and relay 430 will be energized for a maximum portion of a control cycle and air will be supplied to the air lift and suspension be discharged from the unit 10 during a maximum portion of the cycle. As shown in dotted lines in FIGURE 4, the cam is in a position corresponding to the minimum height of the settled material and it will take pin 421 a minimum time to reach the micro switch 425; hence the motor 211a and relay 430 will be energized for a minimum portion of a control cycle and air will be supplied to the air lift of treating unit 10 and thickened suspension be discharged therefrom for a minimum period.

The purging of the sample from chamber 70, venting of excess air from the sampling chamber and removal of $L_1$ from the field coil of motor 25 are carried out by timer 130a in the same manner as described in connection with FIGURE 1.

The cam 410 can be shaped to suit any desired value of concentration of the suspension by increasing or decreasing the maximum and the minimum distance between the point of contact of roller 421 with its edge and the micro switch 425. To provide for adjustability with respect to an increase or decrease of the concentration from a previously set value, the motor-magnetic clutch combination 210a with its arm 420, and the micro switch 425 can be mounted on a vertically adjustable plate, such as plate 99 of FIGURE 1, and a rack and pinion, such as shown at 103 and 105 in FIGURE 1 may be provided for raising and lowering of the plate.

If it is desired to maintain the predetermined concentration of the suspension in a treating unit by controlling instead of the discharge from the treating unit the introduction thereinto of suspension from a preceding unit, then the signal obtained in the receiving unit during the time the pin 222 of FIGURE 2a travels from micro switch 224 to micro switch 226, or the pin 421 of FIGURE 4 travels from cam 410 to micro switch 425, can be applied to the solenoid valve controlling the air lift of the preceding unit. In such case the time during which the air lift in the preceding unit is supplied with air must be inversely proportional to the height of the sediment in the receiving treating unit. This can be attained in the embodiment of FIGURES 1 to 3 by reversing the rotation of the output shafts 231 and 235 of motors 211 and 216 so that shaft 231 rotates counterclockwise and shaft 235 rotates clockwise. As will be obvious from FIGURES 2a and 3, the micro switch 226 will then be pushed farther away from micro switch 224 when the "time on" increases, i.e., when the height of the sediment decreases, to lengthen the time of withdrawal of suspension from the preceding unit and introduction into the receiving unit; and, vice versa, with an increase in the height of the sediment the switch 226 will be pushed nearer to switch 224 to shorten the time during which suspension is introduced.

Similarly, in FIGURE 4 the normally open relay 430 can be replaced by a normally closed relay, whereby the air lift of the preceding unit will be off as long as the motor 211a is energized and on for the balance of the cycle. Obviously, when the period during which the motor is energized decreases due to a decrease in the height of the sediment, the period during which suspension is introduced from the preceding unit will increase correspondingly, and vice versa, with an increase in the height of the sediment.

It is thus seen that the concentration of the suspension can be maintained equally well by controlling the discharge from a unit whose concentration has deviated from a desired value or by controlling admission of suspension to the unit.

It will be obvious to those skilled in the art that many modifications can be made without departing from the scope and spirit of the invention. Accordingly, I do not wish to limit myself to the exact details of construction of the embodiments shown and described for purposes of exemplification and illustration.

I claim:

1. Means for cyclically controlling the concentration of a suspension comprising a tank for holding a pool of suspension, first means for adding solids in suspension to said pool, second means for discharging solids in suspension from said tank, valve means on said second means, a solids concentrating chamber in said tank wherein a portion of suspension is thickened to a solids concentration higher than the concentration in said pool, said second means withdrawing suspension for discharge from said concentrating chamber, a sampling chamber adapted to receive a sample of suspension from said pool during each control cycle and for retaining said sample for a predetermined time sufficient for settling of said sample, sensing means cyclically determining the height of the sediment from said sample in said chamber, motor means adapted to give a signal when energized, means for cyclically energizing said motor means, means for de-energizing said motor means after a period of time depending on and being proportional to the height of the sediment in said sampling chamber as determined by said level sensing means, and means for applying said signal to said valve means.

2. In combination with a series of tanks, each of said tanks having means for discharging solids in suspension therefrom to the next following tank, means for maintaining the concentration of suspension in said series of tanks substantially at the same value, said means comprising a solids concentrator in each tank wherein a portion of suspension is thickened to a higher concentration than the concentration in the respective tank, said means for discharging solids in suspension to the next following tank withdrawing said solids from said concentrator, a sampling chamber connected to each tank and adapted to cyclically receive a sample therefrom, means for retaining said sample in said chamber under quiescent settling conditions for a predetermined portion of a control cycle and for purging it thereafter from said sampling chamber, a float in each sampling chamber, means for cyclically lowering said float until it is stopped by the sediment from said sample, and for cyclically raising said float to its initial position, a power circuit, a switch adapted to cyclically close said power circuit, a second switch adapted to break said circuit, the time between closing and breaking of said circuit in any one cycle being a function of the lowermost position reached by said float in the respective cycle, and electrical means in said power circuit adapted to actuate said means for discharging solids in suspension from the respective tank.

3. The apparatus of claim 2, wherein said electrical means is adapted to actuate means for discharging suspension from the preceding tank.

4. Control means for maintaining the concentration of a pool of suspension in a tank substantially constant, comprising means for adding solids to said tank and means for withdrawing suspension from said tank having a higher solids concentration than the concentration of the suspension in said pool, a solenoid valve controlling operation of one of said means for withdrawing suspension, a power circuit through said solenoid valve, a sampling chamber cyclically receiving a sample of suspension from said tank and retaining it under quiescent settling conditions during a predetermined portion of a control cycle, a float in said sampling chamber, means for cyclically lowering said float in said sampling chamber until it is stopped by sediment from said sample, and for cyclically raising it to its initial position, means cyclically closing said power circuit a predetermined time after said float starts its downward movement and means for opening said power circuit a period of time after its closing, the duration of said period of time in any one cycle being a function of the lowermost position reached by the float in the respective cycle.

5. In combination with a series of tanks, each of said tanks having means for discharging solids in suspension therefrom to the next following tank, means for maintaining the concentration of suspension in said series of tanks substantially at the same value, said last named means comprising for each of said tanks, a solenoid valve controlling operation of said means for discharging solids in suspension, a power circuit through said solenoid valve, a solids concentrating chamber wherein a portion of suspension is thickened to a higher concentration than the concentration in the respective tank, said means for discharging solids in suspension withdrawing said solids from said concentrating chamber, a sampling chamber cyclically receiving a sample of suspension from the respective tank and adapted to retain it under quiescent settling conditions during a predetermined portion of a control cycle, a float in said sampling chamber adapted to be cyclically lowered in said sampling chamber until stopped by sediment from said sample, and to be cyclically raised to its initial position, a switch in said power circuit, said switch cyclically closing said power circuit a predetermined period of time after said float has started its downward travel, and electronic means cyclically breaking said power circuit, the time between closing and breaking of said power circuit in any one cycle of operation of said control means being a function of the lowermost position attained by said float during the respective cycle.

6. Control means for maintaining the concentration of a pool of suspension in a tank substantially constant, comprising means for introducing solids in suspension to said pool, means for withdrawing from said tank suspension of higher solids concentration than the concentration in said pool, a solenoid valve controlling operation of said means for withdrawing of solids in suspension, a power circuit through said solenoid valve, a sampling chamber cyclically receiving a sample of suspension from said tank and adapted to retain it under quiescent settling conditions during a predetermined portion of a control cycle, a float in said sampling chamber adapted to be cyclically lowered in said sampling chamber until stopped by sediment from said sample, and to be cyclically raised to its initial position, a cam positioned by said float, a switch in said power circuit cyclically closing said power circuit when said float starts its upward return movement, and a second switch in said power circuit cyclically breaking said circuit, the time between closing and breaking of said circuit in any one cycle of operation of said control means being a function of the lowermost position of said cam reached during the respective cycle.

7. In combination with a series of tanks, each of said tanks having means for discharging solids in suspension therefrom to the next following tank, means for maintaining the concentration of suspension in said series of tanks at substantially the same value, said means comprising for each of said tanks a concentrating chamber wherein a portion of suspension is thickened to a solids concentration which is higher than the concentration in the respective tank, said means for discharging solids in suspension withdrawing suspension from said concentrating chamber, a solenoid valve controlling operation of said means for discharging solids in suspension, a power circuit through said solenoid valve, sensing means cyclically determining the concentration of the suspension in the respective tank, a normally open switch and a normally closed switch in said power circuit, a member adapted to revolve through a predetermined path once during each cycle of operation of said control means, said first switch being mounted in fixed position in the path of said member and adapted to be closed by said member to close said power circuit, said second switch being mounted in variable position in the path of said member and adapted to be opened by said member to open said power circuit, and a positioning device controlled by said sensing means and regulating the position of said second switch in said path as a function of the concentration of said suspension determined by said sensing means.

8. In combination with a series of tanks, each of said tanks having means for discharging solids in suspension therefrom to the next following tank, means for maintaining the concentration of suspension in said series of tanks at substantially the same value, said last named means comprising for each of said tanks a concentrating chamber wherein a portion of suspension is thickened to a solids concentration which is higher than the concentration in the respective tank, said means for discharging solids in suspension withdrawing suspension from said concentrating chamber, a solenoid valve controlling operation of said means for discharging solids in suspension, a power circuit through said solenoid valve, a switch cyclically closing said power circuit, sensing means cyclically determining the concentration of the suspension in the respective tank, motor means in said power circuit having an output shaft rotating in one direction when said power circuit is closed, and in the reverse direction when said power circuit is broken, an arm affixed to, and rotating with, said output shaft, stop means in the path of reverse rotation of said arm, a normally closed switch in said power circuit and in the path of rotation of said arm in said one direction and adapted to be opened by said arm to break said power circuit, the location of said stop means in the path of said arm and thereby the length of the path from said stop means to said normally closed switch, and the time said power circuit is closed, being regulated by said sensing means as a function of the concentration of said suspension determined by said sensing means.

References Cited in the file of this patent

UNITED STATES PATENTS

| 2,442,888 | Cram | June 8, 1948 |
| 2,610,819 | Norcross | Mar. 10, 1953 |
| 2,815,763 | Fanselow | Dec. 10, 1957 |

UNITED STATES PATENT OFFICE
CERTIFICATE OF CORRECTION

Patent No. 2,998,019                          August 29, 1961

Samuel L. Adelson

It is hereby certified that error appears in the above numbered patent requiring correction and that the said Letters Patent should read as corrected below.

Column 1, line 11, for "th" read -- the --; column 2, line 7, after "pool" insert -- of --; column 14, line 44, strike out "one of".

Signed and sealed this 13th day of February 1962.

(SEAL)
Attest:

ERNEST W. SWIDER
Attesting Officer

DAVID L. LADD
Commissioner of Patents